United States Patent
Froy, Jr. et al.

(10) Patent No.: US 9,159,189 B2
(45) Date of Patent: *Oct. 13, 2015

(54) MOBILE GAMING DEVICE CARRYING OUT UNINTERRUPTED GAME DESPITE COMMUNICATIONS LINK DISRUPTION

(71) Applicant: Spielo International Canada ULC, Moncton (CA)

(72) Inventors: David Vincent Froy, Jr., Lakeville-Westmorland (CA); Peter Babin, Dieppe (CA); Bharat Gadher, Dieppe (CA)

(73) Assignee: GTECH Canada ULC, Moncton, NB (CA)

(*) Notice: Subject to any disclaimer, the term of this patent is extended or adjusted under 35 U.S.C. 154(b) by 182 days.

This patent is subject to a terminal disclaimer.

(21) Appl. No.: 13/861,261

(22) Filed: Apr. 11, 2013

(65) Prior Publication Data
US 2013/0273998 A1    Oct. 17, 2013

Related U.S. Application Data

(63) Continuation-in-part of application No. 13/738,780, filed on Jan. 10, 2013, now Pat. No. 9,079,098, and a continuation-in-part of application No. 13/738,790, filed on Jan. 10, 2013, now Pat. No. 9,084,932.

(60) Provisional application No. 61/586,547, filed on Jan. 13, 2012.

(51) Int. Cl.
G07F 17/32        (2006.01)
A63F 13/327       (2014.01)
A63F 13/323       (2014.01)

(52) U.S. Cl.
CPC .......... *G07F 17/3225* (2013.01); *A63F 13/323* (2014.09); *A63F 13/327* (2014.09); *G07F 17/3218* (2013.01)

(58) Field of Classification Search
CPC ............ G07F 17/3218; G07F 17/3225; G07F 17/3223; G07F 17/34; A63F 13/23; A63F 13/235; A63F 13/30; A63F 13/323
USPC .................................. 463/16, 24, 39, 40, 42
See application file for complete search history.

(56) References Cited

U.S. PATENT DOCUMENTS 6,607,441 B1    8/2003    Acres
6,846,238 B2    1/2005    Wells (Continued)

OTHER PUBLICATIONS

International Search Report and Written Opinion, 12 pages, Apr. 9, 2013.

(Continued)

*Primary Examiner* — Damon Pierce
(74) *Attorney, Agent, or Firm* — Patent Law Group LLP; Brian D. Ogonowsky

(57) ABSTRACT

A mobile gaming device may be a player's own personal tablet, smartphone, PDA, etc., with an application program installed via the internet for carrying out a remote gaming session. All gaming functions are carried out by a stationary gaming terminal communicating with the mobile device, such as by using WiFi. The mobile device operates as a user interface. If the communications link is temporarily broken during a game, the mobile device will create the appearance that the game is continuous, such as by continuing to spin reels, until communications are reestablished. The reels will stop once the mobile device receives the final outcome from the gaming terminal. The player may pause the game to temporarily suspend the minimum game frequency rules. The mobile device may switch between gaming terminals. For 3D video, the original format is adjusted for the mobile device. The gaming terminal may be a gaming machine.

18 Claims, 6 Drawing Sheets

(56) References Cited

U.S. PATENT DOCUMENTS

| | | |
|---|---|---|
| 7,804,995 B2 | 9/2010 | Lipton et al. |
| 2002/0122585 A1 | 9/2002 | Swift et al. |
| 2003/0032479 A1 | 2/2003 | LeMay et al. |
| 2003/0064805 A1* | 4/2003 | Wells .............................. 463/39 |
| 2004/0218269 A1 | 11/2004 | Divelbiss et al. |
| 2005/0117637 A1 | 6/2005 | Routhier et al. |
| 2005/0190180 A1 | 9/2005 | Jin et al. |
| 2007/0257101 A1 | 11/2007 | Alderucci et al. |
| 2007/0296859 A1 | 12/2007 | Suzuki |
| 2008/0020845 A1 | 1/2008 | Low et al. |
| 2008/0188308 A1 | 8/2008 | Shepherd et al. |
| 2008/0268959 A1 | 10/2008 | Bryson et al. |
| 2008/0311971 A1 | 12/2008 | Dean |
| 2008/0318684 A1* | 12/2008 | Rofougaran .................. 463/39 |
| 2009/0253487 A1* | 10/2009 | Gagner et al. ................ 463/20 |
| 2010/0298040 A1 | 11/2010 | Joshi et al. |
| 2011/0032329 A1 | 2/2011 | Bauza et al. |
| 2011/0201406 A1 | 8/2011 | Jaffe et al. |
| 2011/0250960 A1 | 10/2011 | Nguyen |
| 2011/0298795 A1 | 12/2011 | Van Der Heijden et al. |
| 2012/0004036 A1 | 1/2012 | Hill |
| 2012/0165101 A1 | 6/2012 | Krishnamoorthy et al. |
| 2013/0019024 A1 | 1/2013 | Sheth et al. |
| 2013/0093752 A1 | 4/2013 | Yuan |
| 2013/0165231 A1 | 6/2013 | Nelson et al. |

OTHER PUBLICATIONS

Bharat Gadher et al., "Computer System and Method for Indoor Geo-Fencing and Access Control", U.S. Appl. No. 61/757,488, filed Jan. 28, 2013, Unpublished.

Bharat Gadher et al., "Automated Discovery of Gaming Preferences", U.S. Appl. No. 13/738,780, filed Jan. 10, 2013, Unpublished.

Bharat Gadher et al., "Automated Discovery of Gaming Preferences", U.S. Appl. No. 13/738,790, filed Jan. 10, 2013, Unpublished.

* cited by examiner

MOBILE GAMING DEVICE CARRYING OUT UNINTERRUPTED GAME DESPITE COMMUNICATIONS LINK DISRUPTION

CROSS-REFERENCE TO RELATED APPLICATIONS

This application is a continuation-in-part of U.S. application Ser. Nos. 13/738,780 and 13/738,790, both entitled Automated Discovery of Gaming Preferences, by Bharat Gadher et al., incorporated herein by reference and claiming the benefit of U.S. Provisional Patent Application Ser. No. 61/586,547.

FIELD OF THE INVENTION

This invention relates to electronic gaming systems, such as gaming systems in casinos or other establishments, and, in particular, to a gaming system where a player may remotely play a gaming machine using a mobile device, such as a tablet, communicating wirelessly with the gaming machine.

BACKGROUND

Using a wireless hand-held device, such as a tablet, to remotely play an otherwise conventional gaming machine in a casino is prior art. The gaming machine, for security and central monitoring/accounting purposes, performs all the processing to deduct a bet from the remote player's stored bank of credits, randomly select a game outcome, determine the award to be paid to the player, and credit the player's bank of credits. The information processed by the gaming machine is wirelessly communicated to the tablet, and the predetermined outcome is displayed to the player (such as by displaying stopped reels), so the tablet's function is basically as a user interface.

The tablet displays on its screen essentially what the player would see if the player was at the gaming machine, but the gaming machine makes all the game decisions. Virtually all player inputs are performed via the tablet's touch screen.

In some prior art systems, when the tablet is in use, another player cannot use the gaming machine. In other prior art systems, one player may play the gaming machine using the tablet, and another player may simultaneously and independently play the gaming machine in the conventional way.

One type of tablet is described in U.S. Pat. No. 6,846,238 to Wells, incorporated herein by reference.

Since the player may walk around the casino with the tablet and be distracted, various issues arise. Some of these issues include actions to be taken in the event the communications link is broken during a game and actions to be taken if a maximum time between games is exceeded. The link can be broken by the player moving beyond the reception range, moving beyond an allowable range, interference, battery failure, or equipment malfunction.

In the Wells patent (column 20, lines 29-47), for example, the gaming machine internally stores video frames of the game outcome in the event there is a communications link failure during the game, since the tablet could not display the outcome of the game and the outcome needs to be later verified. In case of such a link failure, it is very important to eventually prove to the player the actual outcome of the game. In the Wells patent, if the communications link is broken between the time the player initiated the rotation of the reels and the time that the outcome should have been communicated to the tablet to stop the reels, the game displayed on the tablet stops, and the player does not see the outcome. The game is thus terminated. The player becomes confused and agitated by the failure of the system. If the communications link was broken due to the player walking out the reception area, the player must determine this herself and walk back toward the gaming machine console. The tablet must then reestablish communications with the gaming machine. For the player to then determine the outcome of the game, the player must somehow view the stored video frames at the gaming machine. Wells describes the game being "terminated" once the communications link becomes inactive (see column 27, lines 1-2; column 29, lines 35-36; column 31, lines 19-20; column 32, lines 44-47; and column 34, lines 1-3). Such termination of the game prior to the player seeing the result of the game is a significant drawback of the Wells tablet.

Losing the communications link between games, rather than during a game, is much less frustrating, and reestablishing the communications link does not require any verification of a game's outcome.

Accordingly, what is needed is an improved technique for dealing with a communications link being broken in the middle of a game.

Further, in the Wells patent, there is no provision for allowing the player to temporarily suspend play without the system automatically terminating the playing session due to the period between games exceeding an allowable limit. Therefore, in the prior art tablet systems, the player cannot pause play for a legitimate reason and will lose rights to the gaming machine to another player.

Accordingly, what is also needed is a technique to allow the player to pause play on the tablet without the playing session being automatically terminated due to the period between games exceeding an allowable limit.

Another disadvantage of the Wells tablet is that it is customized for use as a gaming tablet to be used in conjunction with the licensed gaming machine (see column 12, lines 11-21). In one embodiment, the Wells tablet is a modified version of a commercially available tablet. This adds cost to the system since the casino must provide the tablets, and the players will initially be unfamiliar with the operation of the tablet, inhibiting wide spread acceptance of the system.

Accordingly, what is also needed is a mobile gaming device, such as a tablet, that is an off-the-shelf commercially available device, running a suitable application, that may be personally owned by the players and which communicates with licensed gaming machines located in the same jurisdiction in which the mobile gaming device is located.

It is known to access a gaming site via the internet using any suitable computing device, but such an internet connection only connects the computing device to a server running a gaming program, typically located outside of the United States. The server is not a licensed gaming machine in the jurisdiction in which the computing device is located. Therefore, operating the computing device to carry out the game may be illegal in the jurisdiction in which it is operated. Additionally, even operating such an internet-connected computing device in a jurisdiction that allows gaming does not typically authorize the player to operate the computing device for gaming purposes since the operation is not performed in an authorized venue.

Another disadvantage of the prior art tablets is that there is no provision to remotely select another gaming machine and automatically set up the communications link to the new machine. The remote player has no way of knowing which other games or other gaming machines are available for play. A related disadvantage is that the prior art tablets do not allow the player to use the tablet for different gaming machines/servers in different gaming venues.

Another disadvantage of prior art tablets is that, if the player does not have a central account, cashing out is not convenient since the player must either go to the gaming machine to receive a printed ticket or somehow identify the game on a separate printer terminal, such as by using a keypad.

Gaming machines and tablets may incorporate 3D image viewing capability, such as by having a lenticular lens over the screen to direct two interlaced stereoscopic images to the player's respective left and right eyes. A disadvantage of the prior art gaming tablets is that there is no provision for converting the gaming machine's 3D format of the original stereoscopic image to the tablet's particular 3D or 2D format. If the tablet does not have 3D capability, the original stereoscopic images cannot be displayed on the tablet's screen without appearing blurry. Further, with a gaming machine, the 3D image is tuned for a particular viewing distance, while the viewing distance for the tablet may be different, typically closer since the screen is much smaller. There is no provision in the prior art for allowing the remote player to adjust the 3D viewing distance (or image depth).

Another disadvantage of prior art gaming tablets is that there is no forced prevention of the player initiating a game when the battery power runs low. Therefore, an incomplete game may result if the battery power runs out during a game.

SUMMARY

A hand-held gaming device and operating technique are described that overcome the drawbacks of the prior art. In one embodiment, the player's own tablet (e.g., an Apple iPad™) is used as the hand-held gaming device. In other embodiments, any suitable mobile device may be used, including the players' own smartphones, personal digital assistants, etc. A conventional tablet will be used in most examples.

The tablet communicates wirelessly with a stationary gaming machine using encrypted signals. The tablet basically acts as a remote user interface for the gaming machine, while the gaming machine conducts the game itself and controls the player's account.

The player registers the tablet for play with a particular gaming machine and establishes a session time, such as two hours. This may be done by the player inserting her player tracking card into the gaming machine and entering certain information via the gaming machine's touch screen. A communications link between the tablet and the gaming machine is then established. Near Field Communication (NFC) may instead be used to set up the link, where a link is automatically established (according to established protocols) when the tablet is brought near the gaming machine. The gaming machine may use the tablet's MAC address, serial number, or other hardware/software signature to uniquely identify the tablet. The player creates a bank of credits using the player's player tracking card, or by inserting money or a printed ticket (for cashless gaming) into the gaming machine, or by other means either at the gaming machine or via the tablet.

In one embodiment, the gaming machine displays that the machine is in use by a remote player and also displays the remaining session time. Prospective players may register to reserve the machine by inserting their player tracking card into the gaming machine and registering via the gaming machine's touch screen. The queued player then gets a message on her own tablet stating when the gaming machine is available. The queued player only needs to respond via the tablet to begin the next session if the player has stored credits available. In another embodiment, the queued player must return to the gaming machine to register and begin the session.

The tablets are generic and may operate with any of a number of authorized gaming machines. In one embodiment, the tablets are commercially available (e.g., an iPad) and only an application needs to be downloaded to the tablet (such as via the internet) to allow the tablet to operate in accordance with the invention. The application may be specific for the gaming venue or generic.

The tablet presents a user interface touch screen display to the player. The particular display presented by the tablet to the player may be identified by commands transmitted by the gaming machine.

In an example of the game being a video reels game, the player places bets and starts the video reels spinning via touch screen buttons on the tablet. The tablet includes a stored spin-reels program that causes the tablet to display the reels spinning. The spin-reels program may be downloaded from the gaming machine or a server prior to the first game played on the gaming machine being initiated. Since different gaming machines may play different games and have different graphics, the spin-reel program may be different for each type of game and must therefore be customized for the particular gaming machine being played. In one embodiment, only the different graphics are downloaded before a game is initiated and other functions are generic to all the gaming machines.

The gaming machine receives the player inputs and controls all aspects of the game. The gaming machine instantly determines the outcome of the game (the stop positions of the reels) using a random number generator and determines the resulting award using a pay table. The gaming machine then transmits the outcome and award information to the tablet, and the tablet displays the reels eventually stopping at the predetermined positions and displays the award to the player. The length of time the reels appear to spin is irrelevant to the game. The gaming machine deducts or adds credits from/to the player's account, and such credits are displayed to the player. The player is typically unaware that the game outcome is determined by a random number generator prior to the reels stopping and believes that the ultimate displayed stopped positions of the reels determine the award paid. Therefore, the un-interrupted display of the reels spinning and stopping is very important to the player.

Since the player may roam with the tablet, the tablet may occasionally be out of the communication range of the gaming machine (or out of some other allowable range). Most of the time, the player will be actively engaged in a game. If the communications link is broken during a game, rather than terminating the game and stopping the display of the game as is performed by the prior art, the tablet displays the continuing spinning of the reels using the tablet's internal spin-reels program and displays a stored message to the player that the player must reenter the transmission reception area within a certain time limit (e.g., 15 seconds) to complete the game. The player will, of course, comply. When the player reenters the transmission reception area, the tablet automatically reestablishes contact with the gaming machine (pursuant to stored protocols), and the tablet receives the game outcome from the gaming machine. The tablet then stops the reels to display the predetermined outcome. The player is unaware that the game outcome had previously been determined and believes that the game was just extended. This is much more satisfying to the player than the game being terminated due to the broken communications link.

The link may also be broken due to interference or other issues, but the display of the spinning reels continues until the link is reestablished or the "reconnect timeout" period has lapsed.

Since the player is actively playing the game a majority of the time, there is a substantial likelihood that a disruption in the communications link will occur during the game rather than between games.

If the player does not reenter the transmission reception area within the allowable "reconnect timeout" period, the playing session is terminated, and a stored message appears that the player may review the results of the game by re-registering with the gaming machine.

Another aspect of the invention relates to the gaming machine automatically terminating the tablet's playing session after a period of inactivity (typically only a few minutes). Automatically terminating the gaming session due to inactivity is described in the Wells patent in column 25, lines 25-27. However, since the registered playing session may be a few hours, the player should be able to be inactive for a period of time without the gaming machine terminating the session, such as if the player needs to exit the play area for a washroom break, a smoking break, eating dinner, or go to her hotel room. The present invention provides the player with a pause button on the tablet that allows the player to enter an allowable inactive period without penalty. The session still expires after the registered session time, but the gaming machine will not terminate the session within the period of inactivity selected by the player. The selectable inactive period will typically be limited to, for example, 30 minutes to limit the loss of revenue by the casino. However, the selectable times may vary by day, time of day, or based on the number of people in the casino or waiting to play the gaming machine.

If the player does not begin playing a game on the tablet within the allowable inactivity period, and after a warning is given, the session will terminate.

The player may renew the session time, if there are no other players queued up for the machine, allowing for unlimited play on the tablet.

The session may automatically terminate if the communications link is broken for more than, for example, 60 seconds and the player has not responded within 15 seconds after the communications link has been restored. Stored warning messages are displayed to the player.

The gaming machine may display the queue of other players who have registered to play the machine, either locally or via a tablet, once the session time has run out.

When the player wishes to cash out, the player may cash out at the gaming machine and receive a printed ticket to redeem at a cashier's window, or the player's account may store the remaining credits, or the ticket (with a bar code) may be displayed on the player's tablet. In another embodiment, the player may obtain the printed ticket or redeem her remaining credits at any suitable terminal. A separate printer terminal (not a gaming machine) may print out the player's coded ticket when the player wishes to cash out. The printer terminal may sense the proximity of the tablet using NFC and automatically determine the gaming session code so that the player does not need to manually enter data into the printer to cash out. The player may redeem the ticket for cash at a redemption area. The printer terminal may also be a registration terminal for the tablet, so the player never has to physically be at the gaming machine to register for play. The communications between the tablet and the gaming machine may be via a wireless connection between the registration terminal and the tablet, then the registration terminal communicates to the gaming machine through the casino's existing network.

In another embodiment, the venue's system automatically recommends other games and gaming machines to the player via the player's tablet. The player may select any recommended game via the tablet, and the player's credits are transferred to the new gaming machine via the venue's network, and a communications link to the new gaming machine is automatically established. In one embodiment, the same tablet may communicate with gaming machines or servers in different venues and the revenue is appropriately shared. Credits may even be transferred between venues. In one embodiment, when a player uses a player tracking card, the player's past history of gaming may be used by the recommender algorithm to recommend games to the player. If the player does not use a player tracking card and thus plays anonymously, the recommender system detects the player's real time game play (e.g., game selected, bet amount, etc.) and recommends other games to the player consistent with the real time game play.

If the gaming machines displays the game in 3D (requiring stereoscopic images to be generated), the system is capable of modifying the format of the images to be compatible with the tablet. For example, if the tablet can only display 2D images, the original images are converted to the format needed to be displayed by the tablet in 2D. Further, if the tablet has 3D capability, the original image format is suitably changed, if necessary, to be compatible with the tablet 3D format. Resolutions and 3D image depth may also be modified to be optimal for the tablet.

The remaining battery power is sensed by the tablet and, if the power is below a threshold, the tablet software prevents the player from initiating a new game. The remaining power may be used to cash out. A message is displayed to the player allowing the player to switch to another tablet or to recharge the tablet.

In one embodiment, the tablet communicates with any type of secure terminal that carries out the game, where the terminal is not necessarily a gaming machine in a casino or other gaming establishment but any terminal that can perform the required processing.

In another embodiment, the mobile gaming device may be connected to the gaming machine with a cable, either directly connected to a port of the gaming machine or via a network communicating with the gaming machine.

Any game may be presented on the tablet, including video reels, video poker, keno, roulette, blackjack, or other games.

The tablet itself may be a generic tablet, such as an iPad, Android tablet, Windows tablet, or other commercially available tablet. The mobile gaming device may instead be any other portable computing device, including smartphones, personal digital assistants, laptop computers, etc. By the players using their own devices, they are familiar with their operation. Further, the casino does not need to supply the mobile gaming devices.

Therefore, the remote gaming system may be readily implemented at virtually no cost, and increased play activity will bring in added revenue to the casino. The gaming machines with which the mobile gaming devices are communicating are licensed for the venue (e.g., a casino) in the particular jurisdiction (e.g., Nevada) in which they are operating. Since the mobile gaming device is located in the same jurisdiction, the gaming rules in that jurisdiction also apply to the remote play. Since the mobile gaming device performs no gaming function other than as a user interface, the mobile gaming device will typically not need a special license by the jurisdiction and thus the player may legally operate the mobile gaming device.

Since the tablet may not be licensed by the jurisdiction for gaming outside the casino (or other venue) or other designated area, it may be required to have an enforced boundary for the tablet. In one embodiment, a Geo-fence system is set up in the venue, which automatically detects that an active gaming tablet is within a designated boundary. Since the tablet may be owned by the player, the system uses the existing WiFi, Bluetooth, and Received Signal Strength Indicator (RSSI) capability of the tablet to determine whether the tablet is within a designated area. This test may be performed before a transmission by the tablet is authorized for use during a gaming session. If the tablet is determined to be within the designated area and the tablet is authenticated, communications between the tablet and the gaming terminal may then proceed.

The conventional aspects of a gaming tablet may be those described in the Wells patent.

Various other embodiments are described.

BRIEF DESCRIPTION OF THE DRAWINGS

Elements that are the same or equivalent are labeled with the same numeral.

DETAILED DESCRIPTION

Figure 1:
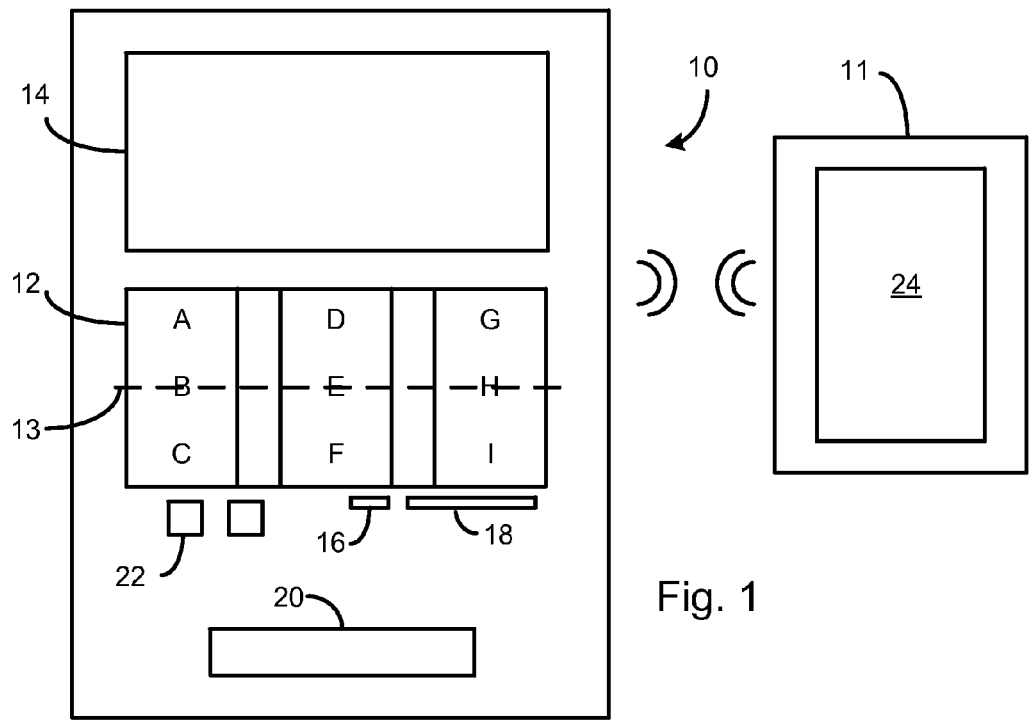
FIG. 1 illustrates a gaming machine console wirelessly communicating with a hand-held tablet (as one example of a mobile gaming device) in accordance with one embodiment of the invention.

FIG. 1 illustrates a simplified stationary gaming machine 10 wirelessly communicating with a mobile gaming device. The gaming machine 10 is licensed for use in the particular jurisdiction (e.g., Nevada) in which it is operated. The gaming machine 10 may instead be a server. In the example of FIG. 1, the mobile gaming device is a conventional tablet 11, such as an iPad tablet. All aspects of the gaming machine 10 that are not directly related to the present invention may be conventional, since the gaming machine 10 may be played in a conventional manner as well as played remotely using the tablet 11.

The gaming machine 10 in the example includes a bottom display 12 that may be a thin film transistor (TFT) display, a liquid crystal display (LCD), a cathode ray tube (CRT), or any other type of display. The display 12 may also be a transparent area revealing physical motor-driven reels. In the example shown, the main game in display 12 is the conventional random selection of a 3×3 array of symbols, where an award is granted based on the combination of symbols across a pay line 13. The main or primary game can be any game, such as a 5 column×3 row array of symbols, a 5×4 array of symbols or any other size or shape array, a video card game, or other game.

A top display 14 is a video screen, which may be similar to the display 12, that displays a secondary game or a static display.

A coin slot 16 accepts coins or tokens in one or more denominations to generate credits within the machine 10 for playing games. An input slot 18 accepts various denominations of banknotes, or machine-readable tickets, or player tracking cards and may output printed tickets for use in cashless gaming. A coin tray 20 receives coins or tokens from a hopper upon a win or upon the player cashing out. Player control buttons 22 include any buttons needed for the play of the particular game or games offered by the machine 10 including, for example, a bet button, a spin reels button, a cash-out button, and any other suitable button. Buttons 22 may be replaced by a touch screen with virtual buttons.

The tablet 11 includes a touch screen 24 that displays a user interface and generally replicates what would normally be seen on the gaming machine's display 12. When playing in the remote mode, the gaming machine display 12 will typically not display the game, and the game will only be displayed on the tablet 11.

Figure 2:
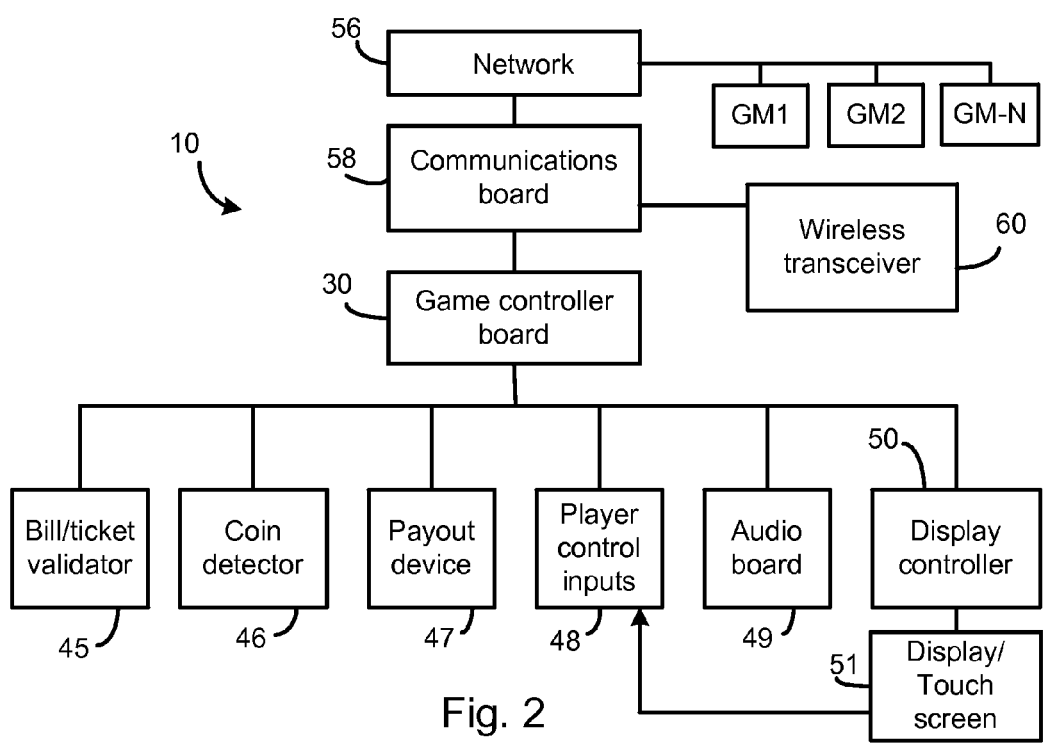
FIG. 2 is a block diagram showing the basic functional units in the gaming machine of FIG. 1.

FIG. 2 illustrates basic circuit blocks in the gaming machine 10 of FIG. 1. A game controller board 30 includes a processor (CPU) that runs the gaming program (including the remote-gaming application) stored in a program ROM, such as a CD. The program ROM may include a pseudo-random number generator program for selecting symbols and for making other random selections. At least the active portion of the program is stored in a RAM on the board 30 for access by the processor. A pay table ROM on the board 30 detects the outcome of the game and identifies awards to be paid to the player. A bill/ticket validator 45 and coin detector 46 add credits for playing games. A payout device 47 pays out an award to the player in the form of coins, a printed ticket, or a credit to the player's account at the end of a game or upon the player cashing out. Player control inputs 48 receive pushbutton inputs for playing the game and touch screen sensor inputs for playing the game. An audio board 49 sends signals to the speakers. A display controller 50 receives commands from the processor and generates signals for the various displays 51. The touch screen portion of the displays 51 provides player selection signals to the processor.

The game controller board 30 transmits and receives signals to and from a network 56 via a communications board 58. The network 56 includes servers and other devices that monitor the linked gaming machines 10 and GM1-GM-N and provide communications between the machines 10 and GM1-GM-N.

In addition to the conventional aspects of the gaming machine 10, the gaming machine also includes a wireless transceiver 60 that communicates with the tablet 11 via, for example, standard WiFi or Bluetooth, since WiFi and Bluetooth capability are typically already present in commercially available tablets, such as an iPad. When the gaming machine 10 is operating in its remote play mode, the user interfaces of the gaming machine 10 will typically be inactive, and the tablet 11 will display the appropriate user interface and game.

Figure 3:
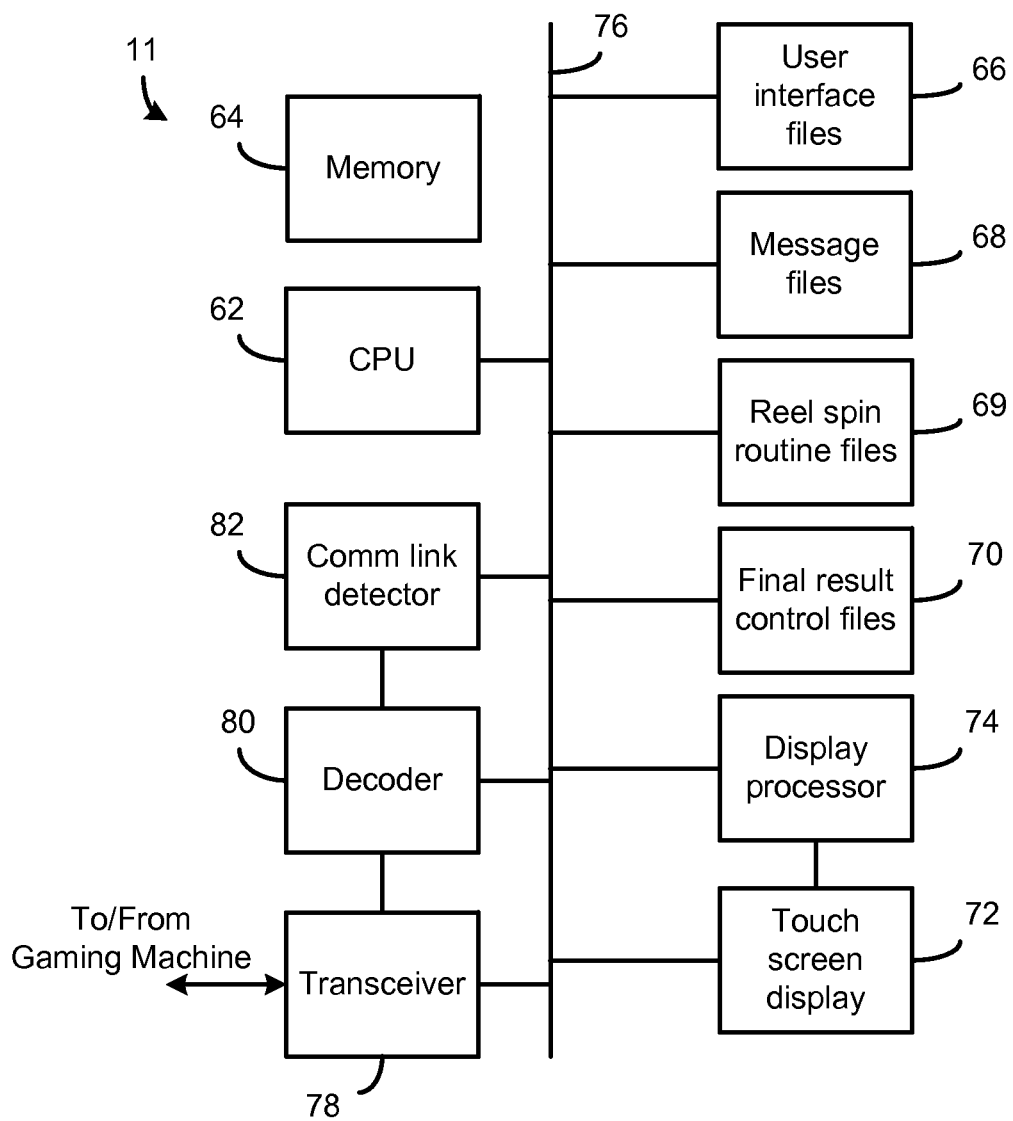
FIG. 3 illustrates various functional units and program files in the tablet that may be used to carry out the present invention.

FIG. 3 illustrates some pertinent functional elements in the tablet 11 used for the remote play.

The tablet 11 includes at least one CPU 62 for carrying out the game and support functions. A memory 64 (RAM and ROM) stores the game program files and other files for remote gaming. Such files are downloaded from a website in a conventional way. The user interface files 66 for carrying out the game, the display message files 68, the reel spin routine files 69, and final result control files 70 are shown separately but are stored in the memory 64. The display messages files 68 contains messages that are displayed automatically if the communications link between the tablet and gaming machine is broken, as well as contains other messages.

The touch screen display 72 displays the game and user interface. A display processor 74 receives high level instructions from the bus 76 and generates pixel control signals for the touch screen display 70.

A WiFi and/or Bluetooth transceiver 78 generates and receives wireless signals for communicating with the transceiver 60 in the gaming machine 10. A decoder 80 (e.g., a modulator/demodulator) converts received signals to digital (baseband) signals and converts signals to be transmitted to the appropriate format signals. The decoder 80, in combination with the CPU 62, carries out the required protocols for establishing the communications link, performing encryption/decryption, etc.

A communications link detector 80 detects that the communications link between the tablet 11 and the gaming machine 10 has been broken, such as by the player moving out of the play area, interference, etc.

Figure 4:
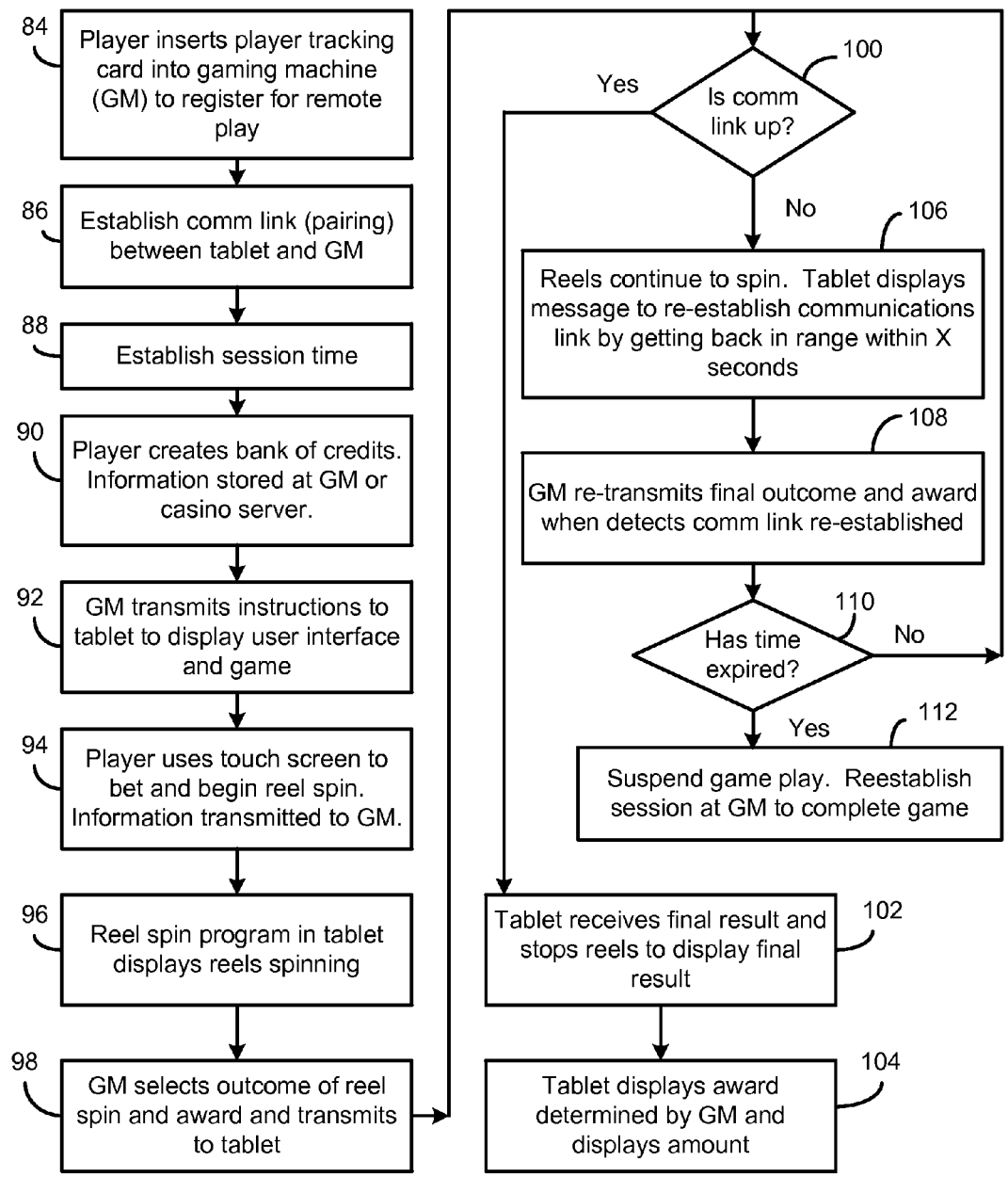
FIG. 4 is a flowchart showing steps performed by the tablet and gaming machine in the event the communications link is broken during a game.

Mobile Gaming Device Carrying Out Uninterrupted Game Despite Communications Link Disruption FIG. 4 is a flowchart showing various steps for carrying out certain processes in accordance with one embodiment of an invention.

Initially, the player downloads the remote gaming application, such as from a website, and inserts her playing tracking card into the selected gaming machine to identify the player and the player's account (step 84).

In step 86, a communications link is then created between the tablet and the particular gaming machine. No casino operator involvement is needed and no customized tablet is needed. The player may use her own personal tablet. The gaming machine has a button or touch screen icon that the player presses to initiate the registration process. An NFC technique may instead be used to initiate the registration process. The gaming machine then may display the set-up instructions to the player.

In one embodiment, the gaming machine contains a wireless transceiver (e.g., a WiFi transceiver) and uses a protocol that detects the proximity of the tablet's WiFi signal, by detecting signal strength, and automatically establishes a communications link with the tablet. The program downloaded to the tablet contains the communications set-up program. This is a type of NFC technique. Appropriate handshaking is performed to establish the link. The tablet's MAC address (or other unique hardware or software code) may be used to identify the tablet and is linked to the player's account.

In another embodiment, the player sets up the communication link by entering the gaming machine's unique ID code displayed by the gaming machine.

In another embodiment, the casino (or other gaming establishment) has a central WiFi system identifier that is displayed on the player's tablet, and the player selects that WiFi system and enters the gaming machine code for setting up a communications link with the gaming machine. The tablet then wirelessly communicates with a central server in the casino, which then communicates with the addressed gaming machine via the casino's network.

Once the communications link is set up between the tablet and the gaming machine, the player establishes a session time (step 88). A menu of allowable session times may be presented to the player, and the player selects one of the times, such as 30 minutes. The sessions may be renewed a certain number of times.

In step 90, the player establishes credits in the gaming machine by using the player's account, depositing cash, inserting a printed ticket, or other conventional means. The player may then roam within the allowable range while playing the game in a manner that is similar to the way the player would play if seated at the gaming machine.

In step 92, the gaming machine, pursuant to the machine's internal gaming program, then transmits instructions to the tablet to display the remaining session time, the user interface for the game, and the game itself. In some scenarios, the player may choose a game from a menu of games. It is presumed that a video reels game will be played.

In step 94, the player uses the touch screen of the tablet to bet and begin the reel spin. The player inputs are transmitted to the gaming machine.

In step 96, a stored program in the tablet (reel spin routine files 69 in FIG. 3) causes the tablet to display the reels spinning, which may be a generic animation of blurred symbols moving down vertically to simulate actual reels spinning. The gaming machine may command the animation to be initiated or the tablet may automatically initiate the animation after the spin-reel button is pressed. The spin-reels program may be downloaded from the gaming machine or a server after the communications link is set up and prior to the first game played on the gaming machine being initiated. The spin-reel program may be different for each type of game and may therefore have to be customized for the particular gaming machine being played. In one embodiment, only the different graphics are downloaded by the gaming machine before a game is initiated and other functions are generic to all the gaming machines. Such generic functions may be part of the generic gaming program initially downloaded to the tablet.

In step 98, the gaming machine then predetermines the outcome of the reel spin using a pseudo-random number generator and a look-up table to identify the required stop positions of the reels. The gaming machine also determines the resulting award using a pay table in the ROM. The reel spin outcome and award are then transmitted to the tablet.

During all steps, the gaming machine continually senses whether the communications link is still up by, for example, receiving periodic signals from the tablet or receiving acknowledgements from the tablet that a command has been received. The communications link may be broken by the player moving out of the allowable range, interference, or other cause. All playing data is stored in the gaming machine and/or central server, so no information is lost in the event of a communications link failure. However, losing the communications link during the game, rather than between games, is particularly problematic since the player has already placed a bet and started the reels spinning. In the prior art remote play systems, the game is terminated upon a communications link failure and the tablet animation is stopped. The player may then have to determine the outcome of the game by accessing the internal memory files in the gaming machine. This is disconcerting to the player. To overcome this drawback, the present invention performs the following routine upon the communications link being interrupted during a game.

In step 100, if the communications link is still up, the final game outcome is transmitted by the gaming machine along with the award amount, and the information is received by the tablet (step 102). The tablet then displays the reels stopping at the final stop positions identified by the gaming machine. The tablet's internal program is used to animate the stopping of the reels at the predetermined stopping positions.

In step 104, the tablet displays the award amount determined by the gaming machine.

If the communications link is broken in step 100 (such as due to the player roaming beyond the allowable range) between the time the player pressed the spin-reels button and the time that the gaming machine transmitted the final game outcome, the internal program in the tablet (part of the reel spin routine files 69 in FIG. 3) causes the animated reels to keep spinning, so the player believes the game is still occurring (step 106). The tablet also displays a stored message telling the player to return to the play area within a certain time, such as 5 seconds.

In step 108, the gaming machine re-transmits the final outcome and award and, assuming the player has re-entered the allowable range within the allowable "reconnect timeout" period (step 110), the tablet receives the final result and stops the reels at their final positions (step 102). Thus, the player perceives the continuous spinning of the reels as just an extended game rather than an interruption in the game.

If the player does not re-enter the playing range within the allowable "reconnect timeout" period (step 110), the gaming machine suspends the game play (step 112). The player must now re-establish the session at the gaming machine to complete the game. The game may then be completed by a re-spinning of the reels and stopping of the reels at the predetermined stopping positions.

Geo-Fence for Determining if Tablet within an Authorize Area

In one embodiment, the allowable range for play on the mobile device (e.g., a tablet or smartphone) is referred to as a Geo-fence, and the Geo-fence application program is downloaded to the mobile device, such as via the internet. In one embodiment of a Geo-fence system, the mobile device sends and receives signals to and from WiFi transceivers distributed around a designated area in the licensed venue. The WiFi transceivers transmit signals, including Received Signal Strength Indication (RSSI) data, which are received by the mobile device and processed by the mobile device. The processed signals encode the device's location relative to the transmitters. The mobile device then transmits the processed signals using the device's WiFi system, and a server determines whether the mobile device is within the designated area. A classification algorithm is used together with the RSSI data to accurately determine whether the mobile device is in or outside the gaming venue boundary with much higher precision than GPS, IP based location, Cell site or WiFi triangulation methods. In one embodiment, the server is networked to all the gaming machines and may control the gaming machines. If the mobile device is transported outside of the Geo-fence and the player does not reenter the Geo-fence within a given time in response to a displayed warning message, the gaming machine is controlled to terminate the session. A suitable Geo-fence system for a mobile gaming device is disclosed in provisional patent application 61/757, 488, filed on Jan. 28, 2013, incorporated herein by reference. Most commercially available mobile computing devices have the capability to run the Geo-fence application. The tablet's internal GPS capability may be used instead of, or in conjunction with, the Geo-fence, but GPS is less accurate than the Geo-fence.

Temporarily moving outside of the Geo-fence does not necessarily cause a communications link failure since there may be adequate signal strength outside the area.

More details of a suitable novel Geo-fence are presented below.

Since the tablet may not be licensed by the jurisdiction for gaming outside the casino (or other licensed venue) or other designated area, it may be required to have an enforced boundary for the tablet. The tablet will be blocked from carrying out a game if it is detected that the tablet is outside the designated area.

In one embodiment, a Geo-fence system is set up in the venue, wherein WiFi transceivers are distributed around the designated area. Bluetooth transceivers may also be distributed for added accuracy, security and reliability. The venue initially creates models by moving conventional mobile devices, such as different models of tablets, smartphone, etc., around the designated area, including along the border areas, while conducting communications between the mobile device and the various WiFi transceivers. During this "calibration" phase, the mobile devices transmit Received Signal Strength Indicator (RSSI) signals (or processed RSSI data) to the venue's system that is stored and used to create the models, or the mobile devices create the models themselves using the RSSI information. The models identify sets of data that are consistent with various types of mobile devices being within the designated area. The models are stored in the venue's system. All conventional mobile devices are equipped with an RSSI system that detects and identifies the received signal's power. In one embodiment, there may be up to 256 levels designated by the mobile device.

During a gaming session with the player's own tablet or smartphone, a test to determine the location of the mobile device is periodically performed, such as prior to a game being commenced, where the mobile device receives signals from the various WiFi transceivers, and the WiFi transceivers are identified with a code. The mobile application, which has been previously downloaded to the mobile device, controls the mobile device to transmit the various RSSI levels, each RSSI level being associated with a WiFi transceiver using the transceiver's code, to the venue's Geo-fence system. By detecting the various RSSI levels associated with each of the WiFi transceivers, then performing a classification algorithm on these levels to identify a position or other data set for the mobile device with respect to the WiFi transceivers, and then comparing the location/data set to the models previously created by the venue for the player's particular mobile device, the Geo-fence system is able to determine whether the mobile device is within or outside of the designated area. In another embodiment, the mobile device itself processes the RSSI data and the processed information is transmitted to the Geo-fence system for comparison to the models. In another embodiment, the mobile device also stores the models, and determines whether it is within the designated area. Those skilled in the art may write suitable algorithms without undue experimentation. A similar test using Bluetooth may also be performed for added accuracy (smaller area) security and reliability.

If the mobile device is determined to be within the designated area and the mobile device is authenticated, communications between the mobile device and the gaming terminal may then proceed. Authentication may simply require the mobile device to transmit a unique code identifying the device or the playing session and matching the code to a previously stored code in the venue's system. In one embodiment, the code is a barcode initially scanned or otherwise received by the mobile device at the beginning of a playing session.

In another embodiment, the mobile application may require the mobile device to transmit an identifying signal at a certain power level, and the different RSSI levels detected at the various WiFi transceiver locations are used to identify the position of the mobile device to determine whether the mobile device is within the designated area.

Although the Geo-fence system described above is believed novel, conventional location systems may also be used. GPS may not be suitable due to signal attenuation by the venue and the lack of accuracy.

Figure 5:
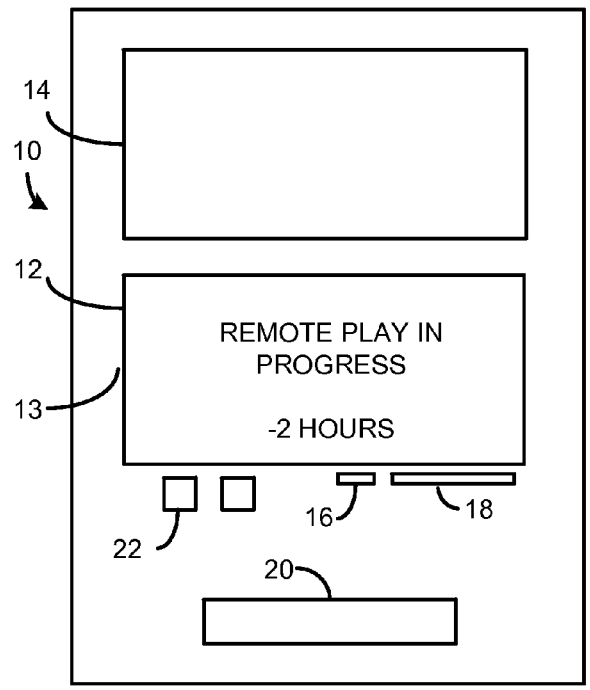
FIG. 5 illustrates the gaming machine displaying the remaining session time.

Remote Gaming Method Allowing Temporary Inactivation without Terminating Playing Session Due to Game Inactivity FIG. 5 illustrates the gaming machine 10 displaying that the machine is being played remotely and shows the time left in the remote session. Players may use the touch screen of the gaming machine to establish a queue to play the machine after the current session. The waiting players may be notified via their tablets when the gaming machine is freed up.

In the prior art, the tablet communications are continuously monitored to determine if the remote player is actively playing. If there is no activity within a few minutes, the session will be terminated. However, this does not give the player an opportunity to briefly suspend play for reasons such as a washroom break, a smoking break, a dinner break, or briefly going to the player's hotel room.

Figure 6:
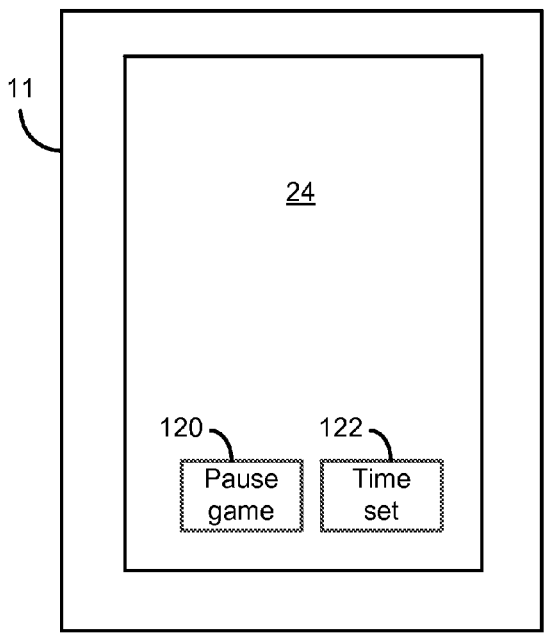
FIG. 6 illustrates the tablet having touch screen buttons allowing the player to pause play without the gaming machine terminating the session due to a period of inactivity.
Figure 7:
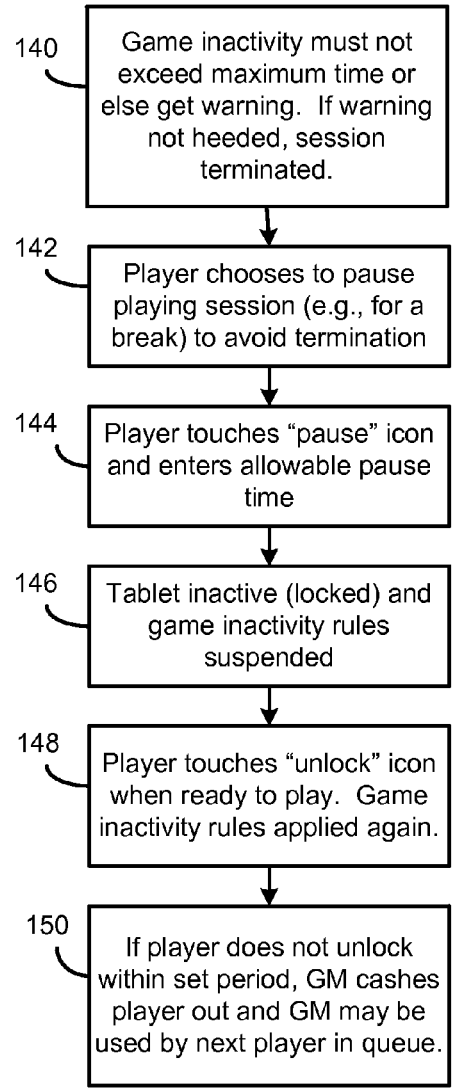
FIG. 7 is a flowchart showing steps performed by the tablet and gaming machine to allow the player to pause play without the gaming machine terminating the session due to a period of inactivity.

FIGS. 6 and 7 are directed to a feature that allows the player to pause the game a certain number of times during the session without the session terminating for inactivity.

FIG. 6 illustrates that the tablet 11 may display a pause game icon 120 and, optionally, a time-set icon 122. Touching the pause game icon 120 may give the player, for example, a 5, 10, or 15 minute period of allowable inactivity without the session being terminated. During this time, the tablet may be taken out of the allowable area without any penalty. When the player re-enters the allowable area and sends a communication to the gaming machine 10, the session will commence. This feature is further explained with reference to the flowchart of FIG. 7.

In step 140, the remote game program rules require that the period between games (i.e., game inactivity) does not exceed a maximum time or else the tablet will be commanded to display a warning message to the player to resume play. If the warning is not heeded, the session will be terminated.

In steps 142 and 144, the player, at any time, may touch a pause game icon on the tablet to suspend the game-inactivity-rules for a certain period of time, such as 5-15 minutes. The pause time may be selected by the player or fixed. The allowable pause time may change depending on the day, time of day, queued players waiting to play the gaming machine, etc.

In step 146, the tablet is now inactive (or locked) and the game inactivity rules enforced by the gaming machine are temporarily suspended. The pause does not extend the allowable session time.

In step 148, the player touches an unlock icon to resume play. The tablet sends a signal to the gaming machine that the tablet is now unlocked. The game inactivity rules are again applied. The player may be allowed a maximum number of pauses per session.

In step 150, if the player does not unlock the tablet within the allowable inactivity period, the session is terminated, the player is cashed out, and the next player in the queue may play the gaming machine.

Cashing out the player may be by crediting the player's account, or by printing a ticket by the gaming machine or other terminal, or by displaying a ticket on the player's tablet. A barcode on the ticket may be scanned at a redemption station to verify it and determine the amount. The verification code must match the player's tracking card code for the ticket to be redeemed.

Although a gaming machine has been used as the secure terminal that performs all the gaming functions, a terminal or server that cannot be directly played by a player may also be used.

Any game may be presented on the tablet, including video reels, video poker, keno, roulette, blackjack, or other games.

Remote Gaming Using Player's Own Tablet or Smartphone in Conjunction with a Gaming Terminal The tablet itself may be a generic tablet, such as an iPad, Android tablet, Windows tablet, or other commercially available tablet. The mobile gaming device may instead be any other portable computing device, including smartphones, personal digital assistants, laptop computers, etc. The players may use their own iPad, iPhone, or other unsecure mobile device as the gaming device after the player has downloaded the application for the remote gaming program into their device. The application may be available on-site or via the internet, such as from the Apple App Store. The communications link between the gaming machine and mobile gaming device may be established by using the device's unique serial number, MAC address, or other hardware signature. Thus, it will be common for the player to leave the venue or transmission reception area while carrying their mobile gaming device. The encrypted communications may be by Bluetooth, WiFi, or other supported method.

By the players using their own devices, they are familiar with their operation. Further, the casino does not need to supply the mobile gaming devices. Therefore, the remote gaming system may be readily implemented at virtually no cost, and increased play activity will bring in added revenue to the casino.

The invention also applies to tablets and other mobile devices where the screen is a foldable screen having two sections, where one section of the screen is used for the game display and the other section of the screen is used for advertisements or as a user interface or for a bonus game.

The gaming machines with which the mobile gaming devices are communicating are licensed for the venue (e.g., a casino or video lottery terminal (VLT) establishment) in the particular jurisdiction (e.g., Nevada) in which they are operating. Since the mobile gaming device is located in the same jurisdiction, the gaming rules in that jurisdiction also apply to the remote play. For example, the rules for a particular jurisdiction may limit the number of gaming machines, including customized remote gaming devices. Since the mobile gaming device of the present invention is generic and performs no gaming function other than as a user interface, the mobile gaming device will typically not be classified as a gaming device and does need a special license by the jurisdiction. Thus the player may legally operate the mobile gaming device without it being licensed.

In one embodiment, a central server may also wirelessly communicate with the player's mobile gaming device, such as through the existing communications link already set up between the mobile gaming device and the gaming machine, or through a communications link set up between the mobile gaming device and the central server. The player may set up the general communications link with the central server by viewing available WiFi networks and selecting the particular network.

The mobile gaming device may even wirelessly connect from within a licensed gaming zone (e.g., a casino), via the internet and/or the casino's WiFi network, to a gaming machine that is located in another licensed gaming zone (e.g., another casino). This allows a player to play in a gaming zone of choice or convenience without causing either casino to exceed a regulated limit on the total number of authorized gaming machines in the casino. Therefore, the number of active players in a particular casino may exceed the physical number of gaming machines in that casino. Further the player may access games not available in the gaming zone where the player is located. The revenue in such case may be shareable using an agreed upon formula that involves two or more parties such as two casino owners or two VLT establishments/ VLT operators. The casinos' respective networks keep track of all the transactions on gaming machines located in the casino and identify the particular tablets as well as the payouts for each tablet. If the player is located in one casino and remotely playing a gaming machine that is located in another casino, the player may still cash out in the local casino, since the payout may be tracked to the proper gaming machine and casino for fee sharing purposes. All the gaming machines are assumed to be linked via a network to one or more central servers in the gaming establishment or VLT operator establishment. The various casino networks may share information via the internet or by other channels.

An additional advantage of the mobile gaming device is that the player may walk to a casino staffer or kiosk for any help with the game rather than wait at a gaming terminal for a staffer to help.

Figure 8:
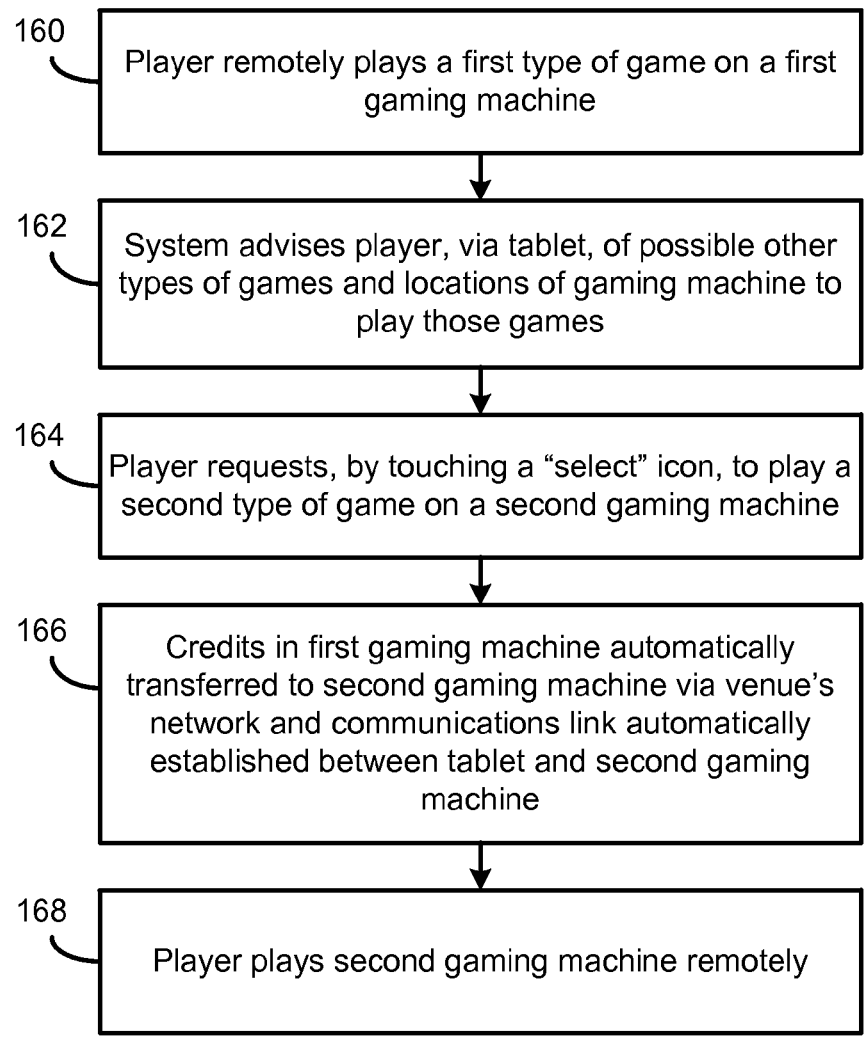
FIG. 8 is a flowchart showing steps performed by the tablet and the venue's system for allowing the player to remotely switch from one gaming machine to another.

Remote Gaming Method where Venue's System Recommends Different Games to Remote Player Using a Mobile Gaming Device FIG. 8 is a flowchart illustrating another feature of the remote playing system relating to remotely switching gaming machines.

In step 160, the player remotely plays a first type of game on a first gaming machine, as described above. The first game, which may be a video reels type game, will typically have a certain theme and bonus game.

In step 162, a central server may advise the player on other games offered by available gaming machines that may be played remotely and the locations of such gaming machines. The central server may recommend certain games and machines based on the player current live game play pattern, or based on other criteria. If the player has not used a player tracking card to play remotely, the player is anonymous, and there is no stored history of the player's gaming patterns in the casino's network. In such a case, the server monitors (in real time) the anonymous player's current gaming habits for the current session, such as the type of game being played, the frequency of play, and the betting amounts. Based on this information, the server identifies the player as a certain type of player and accesses a look-up table or an algorithm is performed to identify other gaming machines and games that are consistent with the player's current gaming pattern. Such recommendations are then transmitted to the player. If the player has used her player tracking card, then the player's stored past gaming history may also be used by the server to recommend other gaming machines and games to the player. The mobile gaming device's own GPS navigation system may be used to find the gaming machines, or another type of navigation system may be used, if the player is required to physically go to the new gaming machine to set up a playing session.

In step 164, the player selects one of the suggested games, offered by a second gaming machine, by touching a "select" icon on the tablet (or other mobile gaming device).

In step 166, the player's credits are automatically transferred from the first gaming machine to the second gaming machine, so that the player does not have to redeem any credit ticket from the first gaming machine. Further, the communications link to the second gaming machine may be automatically set up without the player having to physically register at the second gaming machine, since the communications link information is already known by the central server. The central server keeps track of the player's gaming history via the player's tracking card ID and data transferred from the networked gaming machines.

In another example of transferring credits, let's assume that the remote player does not use a player tracking card and is, therefore, anonymous. Assume the mobile gaming device is linked to the first gaming machine at time T1 and the player wishes to switch to an available second gaming machine, since the game the player wants to play is not available on the first gaming machine. When the player selects to play the second gaming machine using the mobile gaming device, her credentials and registration of her mobile gaming device that were used to play the first gaming machine are automatically migrated to the second gaming machine, such as through the casino's network or via wireless communications between the gaming machines and the mobile gaming device. The first gaming machine will then be unlocked (available) and the second gaming machine will be linked to the mobile gaming device. The migration will take place only if the player had enough stored credits in the first gaming machine to play the second gaming machine.

If the player had used her player tracking card to register with the first gaming machine and has an account with the gaming venue, the migration takes place without the need to check the credit balance on the first gaming machine.

In step 168, the player then remotely plays the second gaming machine remotely.

In another embodiment, the player selects a recommended game, and the selected game is downloaded via the network to the gaming machine the player is already playing. Therefore, no transfer of credits is required. After the player is finished with the session, the gaming machine automatically reverts back to the original game for the next player.

Additional details regarding analyzing a player's gaming preferences and suggesting games to the player may be found in U.S. application Ser. Nos. 13/387,780 and 13/387,790, both entitled Automated Discovery of Gaming Preferences, by Bharat Gadher et al., incorporated herein by reference and claiming the benefit of U.S. Provisional Patent Application Ser. No. 61/586,547. The present remote playing system may use the same systems and methods described in that application.

In some venues, different gaming machines are owned by different entities. In the event that the player switches to different machines owned by different entities, a software program run by a server or the gaming machines determines the fees to be paid to each entity.

In one scenario, some games (and gaming machines) recommended by the server may not even be located in the same venue (e.g., casino) as the one in which the player is currently located. In such a case, the player may still select that game and play the game remotely. The local venue's network acts as an intermediary between the remote venue's network and the player's tablet. The various venues' networks may communicate via the internet or other system. A fee sharing agreement between venues may apply to the remote play. Therefore, if a casino is very crowded and the player's favorite gaming machines are being used, the player may remotely play a similar game or the same type gaming machine in another casino without leaving the first casino. Therefore, both casino's benefit from the invention, creating synergy.

Figure 9:
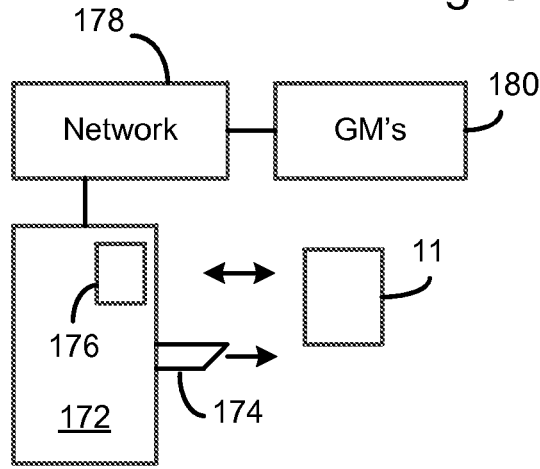
FIG. 9 illustrates the interaction between the tablet and a printer terminal for issuing a ticket.

Remote Gaming System Using Separate Terminal to Set Up Remote Play with a Gaming Terminal In one embodiment, as shown in FIG. 9, the gaming venue (e.g., a casino) provides a dedicated printer terminal 172 for the player to cash out and obtain a printed ticket 174 with a barcode encoding the player and monetary value. The player may enter a session ID into the terminal 172 via a touchscreen 176 or keypad, or the information may be entered via the tablet 11 to identify the player, session, or gaming machine. In another embodiment, a Near Field Communications (NFC) link is automatically established between the terminal 172 and the tablet 11 when the tablet 11 is brought near the terminal 172. The required information may then be automatically transferred between the devices without the player being required to manually enter any data into the printer terminal 172. NFC is a standardized protocol, and both devices may be programmed with the NFC protocol. The tablet's WiFi or Bluetooth transceiver will typically be utilized, and the terminal 172 has a similar capability. The terminal 172 then detects the credits via the venue's network 178 (coupled to the gaming machines 180) and generates the printed ticket 174 for the player. The player may then redeem the ticket 174 for cash at the venue's ticket redemption area.

Additionally, the terminal 172 may also serve as a registration terminal for setting up the link between the tablet 11 and any gaming machine connected to the network 178. Therefore, the player does not have to physically go to the gaming machine to set up the link. In one embodiment, the terminal 172 displays icons for each type of game offered. The player touches the desired icon, and the terminal 172 sets up the communications link between the tablet 11 and the gaming machine providing the game. Credits may be generated using a player tracking card and a casino account, or the player may deposit cash into the terminal 172. In one embodiment, the wireless communication is between the tablet 11 and the selected gaming machine. In another embodiment, the wireless communication is between the tablet 11 and the terminal 172, where the terminal 172 communicates with the selected gaming machine via the casino's existing network 178.

Additionally, the terminal 172 may also allow the player to remotely play games supported by other licensed venues, where the different venues' networks communicate with each other via the internet or other communications system. All the networks can ultimately communicate with any gaming machine (and the terminal 172) connected to a network. The terminal 172 may display an assortment of games, some of which are not available in the local venue but which are available in other licensed venues. The player may select any of the games. If the player plays a game that is supported by a different venue, a fee sharing agreement between venues may determine how to allocate any revenue. Therefore, if a player wants to play a certain game but all the associated gaming machines in the local venue are being used, the player may remotely play the game on a gaming machine located in a separate casino. This effectively increases the number of gaming machines in the casino. Thus there is synergy since both casinos profit. The terminal 172 may act as a communications hub for the tablet (e.g., using conventional WiFi signals) or another communications method may be used.

Figure 10:
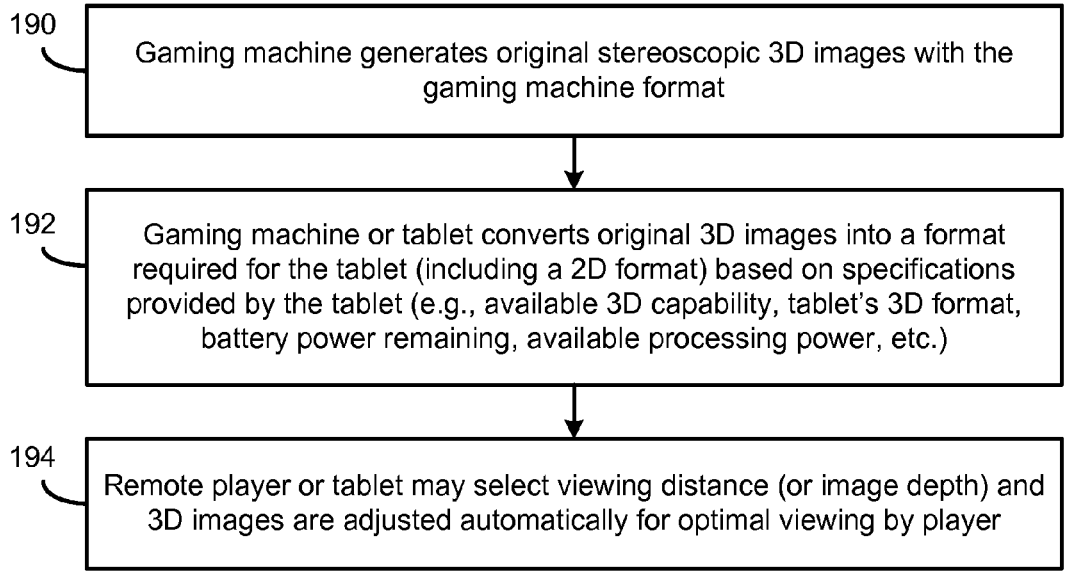
FIG. 10 is a flowchart showing steps performed for converting original stereoscopic images into a format (2D or 3D) compatible with the tablet.

Remote Gaming System Allowing Adjustment of Original 3D Images for a Mobile Gaming Device FIG. 10 identifies certain steps used when the gaming machine generates stereoscopic images for 3D viewing.

A relatively new video gaming format displays the game on the gaming machine screen in 3D (step 190). A standardized video format may be adopted for gaming machines. Such 3D viewing may require a special lenticular lens on the screen so that the player sees a slightly different image with each eye. The screen contains narrow linear lenses extending in the vertical direction, where lenses that direct one image to the right eye are interposed between lenses that direct another image to the left eye. The image generated by the screen is a composite of two different offset images: one to be perceived by the right eye (behind one set of the lenses) and one to be perceived by the left eye (behind the other set of lenses). The two images are stereoscopic and are perceived by the viewer (at the correct distance) as a single 3D image. Such 3D image generation is well known. Other gaming machines may require the player to wear special glasses, whether they be polarized, or colored, or electrically synchronized with the display.

Some tablets 11 do not have the lenticular lens screen and are unable to display the 3D image. Therefore, such tablets must only display a 2D image. Even a tablet that has a lenticular lens may still display a 2D image if the two offset images are identical. A tablet that has a lenticular lens may only be able to display 3D images in a particular format for that tablet.

Therefore, when transmitting the 3D video display information by the gaming machine to a standard tablet (or other off-the-shelf mobile device), problems arise since the tablet may not be configured to display an image that can be viewed by the player in 3D. Further, the video formats for the server or the gaming machine may be different from the format used by the tablet to display video.

In step 192 of FIG. 10, to solve such problems related to 3D video if the tablet does not have 3D capability, the server or gaming machine converts the original 3D video format into a standard 2-D format that can be processed by off-the shelf mobile gaming devices (tablets, smartphones, etc.). Alternatively, the remote gaming program downloaded into the mobile gaming device includes one or more programs for converting the original 3D video format into the appropriate 2D video stream for the mobile gaming device. The mobile gaming device may not have the computing power to convert the formats in real time, however. If such is the case, the server or gaming machine detects the type of mobile gaming device used (based on specifications transmitted by the mobile gaming device) and, based on that information, determines that the server or gaming machine processor is required to convert the 3D video format into the appropriate 2D format and transmit the 2D format to the mobile gaming device.

Some mobile gaming devices may be able to display a 3D video image to the player in a special format. For example, the tablet may have a lenticular lens overlying the screen. The tablet's required 3D video format may be identified to the server or gaming machine, and the conversion into the compatible format may be performed by the server or gaming machine. In some cases, the formats will be the same and no conversion needs to take place.

In one embodiment, when the mobile gaming device connects to the gaming machine, the mobile gaming device's downloaded software controls the device to send a message to the server or gaming machine describing what type of 3D display it supports, if any, and what format it requires. The server or gaming machine then determines whether the mobile device is fast enough to do the work of the conversion on its own or if the server or gaming machine is required to convert the image for transmission.

Once the determination has been made, the server or gaming machine either converts the images and transmits them to the mobile device or sends the original images to the mobile gaming device to be converted to the required format.

In some systems, the mobile gaming device generates the video signals internally based on a locally stored graphic program and does not receive real-time video signals from the server or gaming machine. In that case, the mobile gaming device just receives high level commands from the server or gaming machine to display a stored user interface followed by displaying the running of the stored game routine, the final result, and any award. The server or gaming machine may initially upload the required displays and routines to the mobile device prior to the first game commencing. Therefore, what the remote player sees may be different from what a player would see if playing at the gaming machine in a conventional manner. In this situation, the mobile device might still require some format conversion of the original display information for displaying in 2D or 3D. This work could be done by either the mobile gaming device or the server/gaming machine, depending on the capabilities of the mobile gaming device. Like the situation presented before, the server/gaming machine may ask the mobile gaming device what format it supports and determine if it is required to do any needed conversions.

In some embodiments, the player may need to use special glasses for viewing the 3D image, or a temporary lens overlay may be provided by the venue.

Further details regarding conversion of 3D formats between different devices (not for gaming) include US Publication 2011/0032329, incorporated herein by reference.

Generally, the gaming machine 10 screen is much larger than the tablet 11 screen. The lens and 3D images on the gaming machines are optimized for a particular viewing distance. Typically, the remote player will be closer to the tablet screen than the typical viewing distance of the gaming machine screen. Accordingly, if the original stereoscopic images were displayed on the tablet 11, the resulting image would not be an accurate representation. In one embodiment of the invention (step 194 of FIG. 10), the tablet's software includes a provision for the player to select a viewing distance (which directly corresponds to the player selecting an image's depth). The image processing adjusts the image to be optimally displayed to the player at the desired viewing distance. The optimal viewing distance is affected by the lens system used and the distance between the player's left and right eyes. In an example, the tablet 11 displays a "viewing distance" menu and the player selects the desired viewing distance by selecting an appropriate icon, or the tablet software automatically determines the optimal viewing distance. This parameter is then used to adjust the original stereoscopic images to be optimized for the tablet. The adjustment may be performed by the tablet or by the gaming machine/server.

Processing 3D images and videos requires more processing power than for 2D images (which translates to more battery usage). In one embodiment, the mobile device checks its available battery power or battery life and adjusts the 3D processing, such as by switching to a 2D display, or informs the player and gives the player the option to continue in 3D or switch to 2D. If the player selects to switch to 2D, the gaming machine may be commanded by the tablet to start sending only 2D images. Another option is to communicate the available power in the tablet to the gaming machine, and the gaming machine will send a message to the player identifying the optimal display format and automatically make the adjustment.

These embodiments apply to multiview 3D as well as to other formats of 3D. Multiview Video Coding (MVC) is a video compression standard that enables efficient encoding of sequences captured simultaneously from multiple cameras using a single video stream. MVC is intended for encoding stereoscopic (two-view) video.

Figure 11:
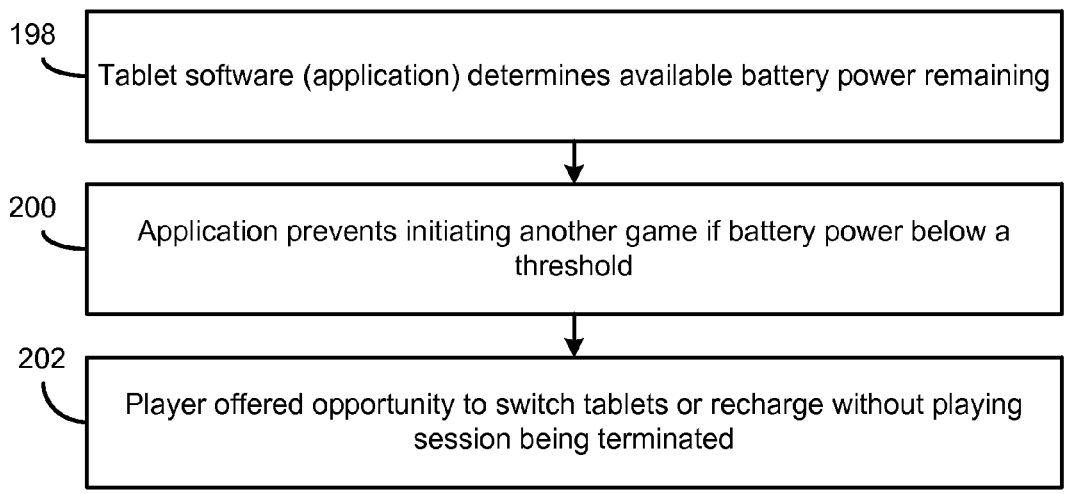
FIG. 11 is a flowchart showing steps performed when the tablet battery power has fallen below a threshold so that a game is not interrupted.

FIG. 11 is a flowchart identifying various steps used when the tablet's battery power is low. It is important that the player is warned well ahead of time if the tablet's battery power is running out. The application (on the mobile gaming device) will detect the tablet's available power (step 198) and alert the player of the playing time remaining so that the player may exit the application in the proper way. Conventional tablets already include a battery level monitor. If the player continues to play after the warning, it is important that the application forces the termination of play between games rather than during a game. The term "during a game" refers to the time between the player initiating a game and the time that the player is informed of the outcome. Accordingly, the application determines when the battery life is below a threshold (e.g., 5 minutes) and prevents the player initiating a new game (step 200). The remaining battery life should be sufficient for the player to cash out at a terminal or at the gaming machine. When the battery power is low, to allow the player to keep playing the same gaming machine without having to again reserve the gaming machine, the application displays a message offering the player the option of switching to another mobile gaming device (step 202). If the player accepts, a sequence of steps involving the player, the gaming machine, and the network is carried out, similar to steps already described, to switch the player to another mobile gaming device within the same playing session.

Multi-Player Gaming Using Mobile Gaming Devices

A group of players entering a gaming establishment together may like to play a social, tournament, community, or progressive game. Such multi-player games conventionally require the players to sit in front of different linked gaming machines. The group of players would therefore be separated. By using the tablets, the players may sit together around a gaming table, at the bar, or in a specific area. The game could be played within an area designated by the tablet. The area may have a large overhead screen that displays social, tournament, community, or progressive elements of linked gaming such as a leader board, progressive meters, social/community/bonusing, etc. The various tablets would wirelessly communicate via the associated linked gaming machine, the local host, or through cellular communications to the central system hosted in the data center. The central server, or one of the gaming machines acting as a server, would accumulate the data for the common display. If the primary communication is lost, then the game can continue temporary with local buffering in the tablets or a backup communications method can be used, such as cellular, WiFi, Bluetooth, etc. The central bank (a memory) for the players' credits could be on the site server and the ability to continue playing when there is a communication break would be very useful.

This multi-player gaming can employ various combinations of tethering aspects in regulated gaming venues detailed above.

Other Features

In alternative embodiments, the mobile gaming device may be connected to the gaming machine with a cable, either directly connected to a port of the gaming machine or via a network communicating with the gaming machine.

Those skilled in the art may write the appropriate software to carry out the invention without undue experimentation. The hardware used may be conventional.

The software used to program the gaming machines and servers in accordance with the present invention may be initially stored on a ROM, such as a CD or an electronic memory device. Such CDs and devices are non-transitory computer readable mediums having the appropriate computer instructions stored thereon. The programming may also be downloaded to the gaming machines via the casino's network.

It should be appreciated that the terminals, processors, or computers described herein may be embodied in any of a number of forms, such as a rack-mounted computer, a desktop computer, a laptop computer, or a tablet computer. Additionally, a computer may be embedded in a device perhaps not generally regarded as a computer but with suitable processing capabilities, including an electronic gaming machine, a Web TV, a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks. As used herein, the term "online" refers to such networked systems, including computers networked using, e.g., dedicated lines, telephone lines, cable or ISDN lines as well as wireless transmissions. Online systems include remote computers using, e.g., a local area network (LAN), a wide area network (WAN), the Internet, as well as various combinations of the foregoing. Suitable user devices may connect to a network for instance, any computing device that is capable of communicating over a network, such as a desktop, laptop or notebook computer, a mobile station or terminal, an entertainment appliance, a set-top box in communication with a display device, a wireless device such as a phone or smartphone, a game console, etc. The term "online gaming" refers to those systems and methods that make use of such a network to allow a game player to make use of and engage in gaming activity through networked, or online systems, both remote and local. For instance, "online gaming" includes gaming activity that is made available through a website on the Internet.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a tangible, non-transitory computer readable storage medium (or multiple computer readable storage media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other non-transitory, tangible computer-readable storage media) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above. As used herein, the term "non-transitory computer-readable storage medium" encompasses only a computer-readable medium that can be considered to be a manufacture (i.e., article of manufacture) or a machine and excludes transitory signals.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags, addresses or other mechanisms that establish relationship between data elements.

Various aspects of the present invention may be used alone, in combination, or in a variety of arrangements not specifically discussed in the embodiments described in the foregoing and the concepts described herein are therefore not limited in their application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While the invention has been described with reference to certain exemplary embodiments thereof, those skilled in the art may make various modifications to the described embodiments of the invention without departing from the true spirit and scope of the invention. The terms and descriptions used herein are set forth by way of illustration only and not meant as limitations. In particular, although the present invention has been described by way of examples, a variety of devices would practice the inventive concepts described herein. Although the invention has been described and disclosed in various terms and certain embodiments, the scope of the invention is not intended to be, nor should it be deemed to be, limited thereby and such other modifications or embodiments as may be suggested by the teachings herein are particularly reserved, especially as they fall within the breadth and scope of the claims here appended. Those skilled in the art will recognize that these and other variations are possible within the spirit and scope of the invention as defined in the following claims and their equivalents.

What is claimed is:

1. A remote gaming method comprising:
   establishing a wireless communications link between a mobile gaming device, operated by a player, and a stationary gaming terminal that carries out a gaming program;
   receiving player control signals by the gaming terminal from the mobile gaming device to initiate a game;
   displaying game animation on the mobile gaming device for the game conveying to the player that the game is presently occurring;
   carrying out the game by the gaming terminal, including determining a final outcome of the game and any award for the outcome;
   transmitting signals from the gaming terminal to the mobile gaming device identifying the final outcome of the game and the award;
   stopping the game animation for the game and displaying, by the mobile gaming device, the final outcome of the game and the award;
   in the event of a communications link failure between the mobile gaming device and the gaming terminal during the game, prior to receiving the signals by the mobile gaming device identifying the final outcome of the game and the award but after the game animation for the game has begun, performing the method comprising:
      extending the game animation for the game by the mobile gaming device during the communications link failure beyond a typical time for the game until the communications link has been re-established; and
      once the communication link has been re-established, transmitting the signals to the mobile gaming device identifying the final outcome of the game and the award, stopping the game animation for the game, and displaying, by the mobile gaming device, the final outcome of the game and the award, such that the game perceived by the player is not interrupted during the communications link failure.

2. The method of claim 1 wherein the gaming terminal is a stationary gaming machine having a display screen, and wherein the gaming machine may be directly played using the display screen.

3. The method of claim 2 wherein the gaming machine and mobile gaming device are operated within a same venue.

4. The method of claim 1 wherein the mobile gaming device is one of a tablet and a smartphone.

5. The method of claim 4 wherein the mobile gaming device is an off-the-shelf tablet or smartphone containing a remote gaming application.

6. The method of claim 1 wherein the step of displaying game animation comprises displaying game animation stored in a memory of the mobile gaming device prior to the game being initiated.

7. The method of claim 1 wherein the game is a video reels type game.

8. The method of claim 1 wherein the player owns the mobile gaming device.

9. The method of claim 1 further comprising:
   periodically controlling the mobile gaming device to communicate between a plurality of transceivers in a venue;
   using Received Signal Strength Indicator (RSSI) level signals derived by communications with the transceivers to determine whether the mobile gaming device is within a designated area within the venue; and
   if it is determined that the mobile gaming device is outside of the designated area, blocking the mobile gaming device from carrying out the game.

10. A gaming system comprising a stationary gaming terminal communicating with a mobile gaming device, the system being programmed to carry out the method comprising:
    establishing a wireless communications link between the mobile gaming device, operated by a player, and the stationary gaming terminal that carries out a gaming program;
    receiving player control signals by the gaming terminal from the mobile gaming device to initiate a game;
    displaying game animation on the mobile gaming device conveying to the player that the game is presently occurring;
    carrying out the game by the gaming terminal, including determining a final outcome of the game and any award for the outcome;
    transmitting signals from the gaming terminal to the mobile gaming device identifying the final outcome of the game and the award;
    stopping the game animation and displaying, by the mobile gaming device, the final outcome of the game and the award;
    in the event of a communications link failure between the mobile gaming device and the gaming terminal during the game, prior to receiving the signals by the mobile gaming device identifying the final outcome of the game and the award but after the game animation for the game has begun, performing the method comprising:
       extending the game animation for the game by the mobile gaming device during the communications link failure beyond a typical time for the game until the communications link has been re-established; and
       once the communication link has been re-established, transmitting the signals to the mobile gaming device identifying the final outcome of the game and the award, stopping the game animation for the game, and displaying, by the mobile gaming device, the final outcome of the game and the award, such that the game perceived by the player is not interrupted during the communications link failure.

11. The system of claim 10 wherein the gaming terminal is a stationary gaming machine having a display screen, and wherein the gaming machine may be directly played using the display screen.

12. The system of claim 11 wherein the gaming machine and mobile gaming device are operated within a same venue.

13. The system of claim 10 wherein the mobile gaming device is one of a tablet and a smartphone.

14. The system of claim 13 wherein the mobile gaming device is an off-the-shelf tablet or smartphone containing a remote gaming application.

15. The system of claim 10 wherein the step of displaying game animation comprises displaying game animation stored in a memory of the mobile gaming device prior to the game being initiated.

16. The system of claim 10 wherein the game is a video reels type game.

17. The system of claim 10 wherein the player owns the mobile gaming device.

18. The system of claim 10 further being programmed to carry out the method comprising:
   periodically controlling the mobile gaming device to communicate between a plurality of transceivers in a venue;
   using Received Signal Strength Indicator (RSSI) level signals derived by communications with the transceivers to determine whether the mobile gaming device is within a designated area within the venue; and
   if it is determined that the mobile gaming device is outside of the designated area, blocking the mobile gaming device from carrying out the game.

* * * * *